(12) United States Patent
Hansen, II et al.

(10) Patent No.: US 6,940,962 B1
(45) Date of Patent: Sep. 6, 2005

(54) DIAL ON-HOLD

(75) Inventors: Harold E. A. Hansen, II, Plano, TX (US); Eric G. Suder, Plano, TX (US)

(73) Assignee: Estech Systems, Inc., Plano, TX (US)

( * ) Notice: Subject to any disclaimer, the term of this patent is extended or adjusted under 35 U.S.C. 154(b) by 744 days.

(21) Appl. No.: 08/872,714

(22) Filed: Jun. 11, 1997

(51) Int. Cl.[7] .............................................. H04M 3/00
(52) U.S. Cl. ............................ 379/265.02; 379/266.01
(58) Field of Search ........................ 379/67.1, 84, 165, 379/265.02, 266.01, 309, 393, 93.01, 93.02, 93.03, 88.26, 210, 212, 215, 335, 334

(56) References Cited

U.S. PATENT DOCUMENTS

| | | | | |
|---|---|---|---|---|
| 4,696,028 A | * | 9/1987 | Morganstein et al. | 379/88.24 |
| 4,799,144 A | | 1/1989 | Parruck et al. | 364/200 |
| 4,878,196 A | | 10/1989 | Rose | 364/900 |
| 4,998,272 A | | 3/1991 | Hawkins, Jr. et al. | 379/88 |
| 5,027,384 A | * | 6/1991 | Morganstein | 379/83.23 |
| 5,166,974 A | * | 11/1992 | Morganstein et al. | 379/67.1 |
| 5,249,219 A | * | 9/1993 | Morganstein et al. | 379/84 |
| 5,381,465 A | | 1/1995 | Carter et al. | 379/67 |
| 5,394,445 A | | 2/1995 | Ball et al. | 379/67 |
| 5,400,393 A | | 3/1995 | Knuth et al. | 379/88 |
| 5,471,523 A | | 11/1995 | Smith et al. | 379/165 |
| 5,483,577 A | | 1/1996 | Gulick | 379/67 |
| 5,546,442 A | * | 8/1996 | Foladare et al. | 379/210 |
| 5,557,658 A | * | 9/1996 | Gregorek et al. | 379/88.25 |
| 5,581,604 A | * | 12/1996 | Robinson et al. | 379/88.13 |
| 5,592,542 A | * | 1/1997 | Honda et al. | 379/265 |
| 5,627,875 A | * | 5/1997 | Kapsales | 455/414 |
| 5,757,897 A | * | 5/1998 | LaBarbera et al. | 379/165 |
| 5,802,157 A | * | 9/1998 | Clarke et al. | 379/196 |
| 5,844,982 A | * | 12/1998 | Knitl | 379/265.11 |
| 5,867,572 A | * | 2/1999 | MacDonald et al. | 379/266.06 |
| 5,930,339 A | * | 7/1999 | Nepustil | 379/88.26 |
| 5,946,386 A | * | 8/1999 | Rogers et al. | 379/265.09 |
| 5,953,401 A | * | 9/1999 | Caveney | 379/211.01 |
| 5,960,064 A | * | 9/1999 | Foladare et al. | 379/88.26 |
| 6,014,439 A | * | 1/2000 | Walker et al. | 379/266 |
| 6,021,190 A | * | 2/2000 | Fuller et al. | 379/211 |
| 6,301,350 B1 | * | 10/2001 | Henningson et al. | 379/220.01 |

* cited by examiner

*Primary Examiner*—Bing Q. Bui
(74) *Attorney, Agent, or Firm*—Kelly K. Kordzik; Winstead Sechrest & Minick P.C.

(57) ABSTRACT

A telephone and voice mail (voice processing) system, which is implemented using only a single processing means for controlling operations of both the telephone system and the voice mail system, permits a caller, which has been placed on-hold, to request and be connected to another destination, such as another telephone extension in the system. Such a process may be performed by a recognition of digits dialed by the caller placed on-hold and then making a connection of the call to the requested extension number associated with the digits dialed.

17 Claims, 10 Drawing Sheets

Fig. 10
(CON'T)

DIAL ON-HOLD

CROSS-REFERENCE TO RELATED APPLICATION

The present invention is related to co-pending patent application Ser. No. 08/873,215, entitled "Telephone Call/Voice Processing System", filed concurrently herewith, which is hereby incorporated by reference herein.

TECHNICAL FIELD

The present invention relates in general to telephone and voice processing systems, and in particular, to a telephone call/voice processing system that permits a call on hold to dial and be connected to another destination.

BACKGROUND INFORMATION

There is a growing trend of individuals leaving large companies and forming their own enterprises with a handful of employees. Upon doing so, one of the first things these people realize is that they miss the tools they were accustomed to using within their former larger company. One of these primary tools is a small PBX (Private Branch Exchange) system or key system for interconnecting a number of local telephone sets to a fewer number of central office ("CO") lines from the local telephone company or a private telecommunications network. Another tool often missed is some type of voice mail system (note, "voice mail system" and "voice processing system" are used interchangeably herein).

The problem for such companies is obtaining a telephone system and a voice mail system that work well together, since typically such systems are manufactured by different companies. The industry is currently separated into two markets, one of those being the voice mail or voice processing market and the other one being the telephone system, or PBX, market. The result is that separate telephone and voice mail systems must be purchased and interconnected to operate correctly and efficiently.

Figure 2:
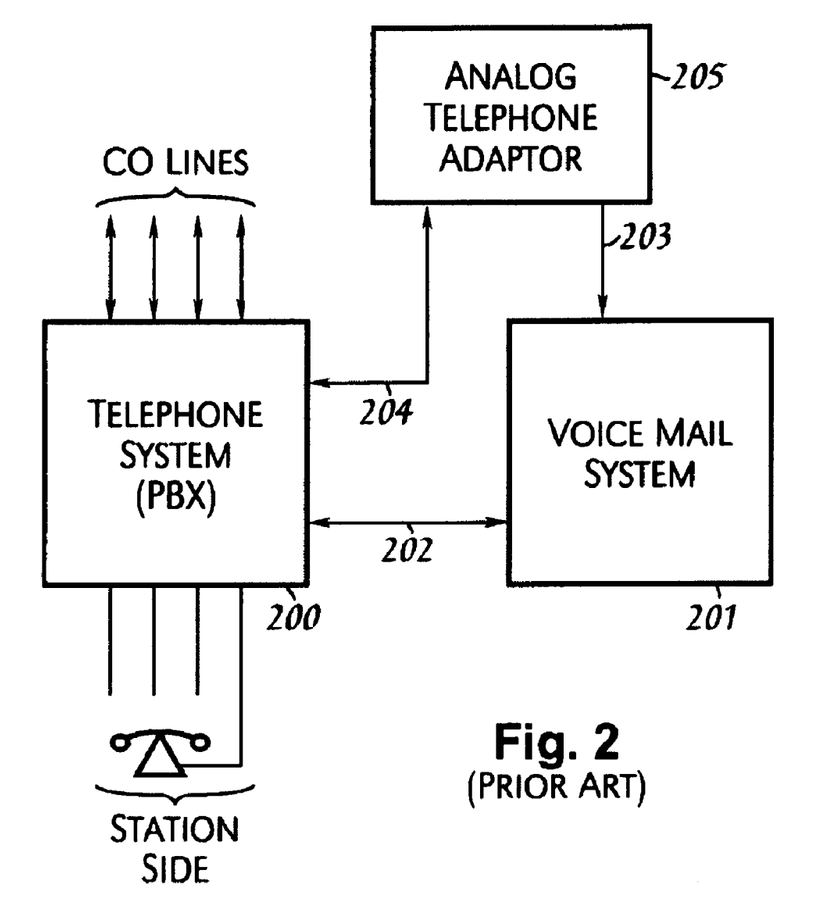
FIG. 2 illustrates a prior art system coupling a telephone system and a voice mail system.
Figure 4:
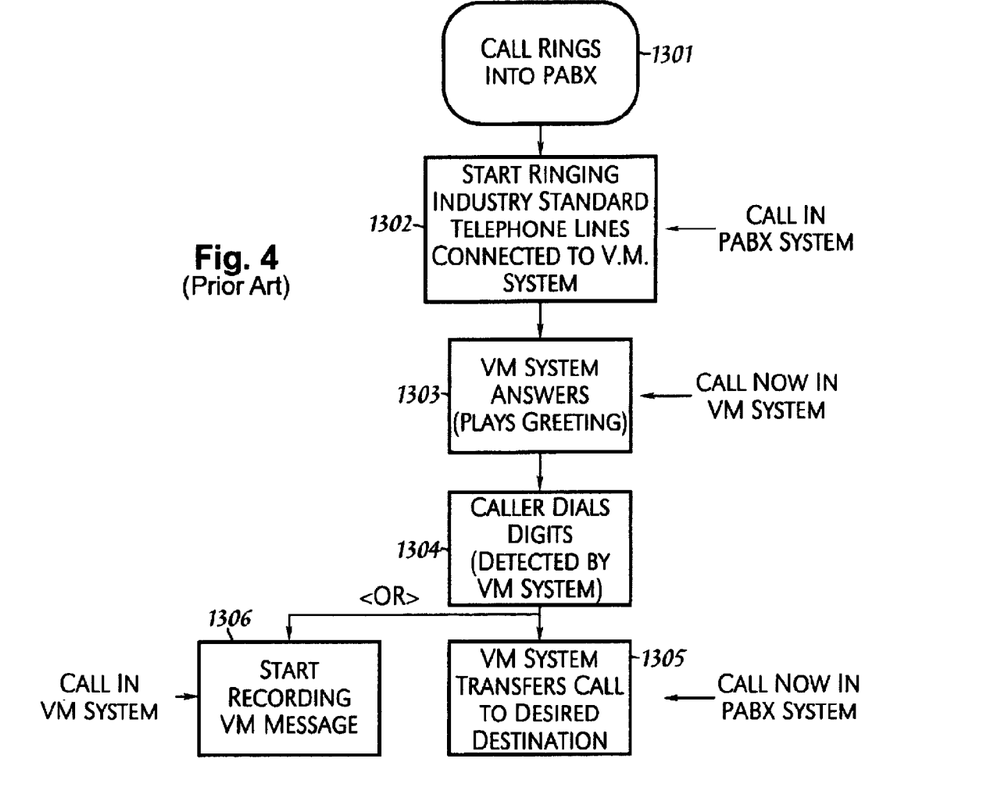
FIG. 4 illustrates a prior art process for call processing.

Referring to FIGS. 2 and 4, there is illustrated a prior art technique for combining telephone and voice mail systems. The dilemma is how to provide communication between the telephone system (PBX) 200 and the voice mail ("VM") system 201. Communication with the telephone system 200 is typically done through either the CO lines or on the station side. Since CO lines are more of a precious resource than the station connections, the prior art system shown in FIG. 2 communicates between the voice mail system 201 and the telephone system 200 on the station side using connection 202. Connection 202 may be an analog telephone line or via an EKT (electronic key telephone) integrated connection. Alternatively, a proprietary EKT line 204 may be coupled to an analog telephone adapter 205, which uses analog line 203 to couple to voice mail system 201.

Such systems are typically configured by programming the telephone system 200 to perform a transfer to ring a group of extensions that are connected to the voice mail system 201 upon one or more occurrences, such as when the outside call into the telephone system 200 to a particular extension receives a busy signal or the extension rings a certain number of times. At this point in time the telephone call resides within telephone system 200 (step 1301). Next, the telephone system 200 performs the same physical functions as an operator by transferring the call using a flashhook and then dialing the extension number (step 1302) pertaining to the voice mail system 201 in order to transfer a call to the voice mail system 201. At this point in time, the telephone call now resides within the voice mail system 201, which may play a greeting to the incoming call (step 1303). In response to the greeting played by the voice mail system 201, the caller may dial digits, which are detected by the voice mail system 201 (step 1304). Thereafter, the voice mail system may record a message spoken by the caller (the incoming call resides in the voice mail system 201; step 1306), or the voice mail system 201 may transfer the call to a desired destination, such as a station extension (the incoming call is now resident within the telephone system 200; step 1305). In-band signalling, a serial connection, etc. may be added to further improve the system, but it is still configured as two separate systems—a telephone system 200 coupled to a separate voice mail system 201.

Another prior art system not shown herein is the use of a personal computer with a voice adapter card inserted therein for interconnecting to a telephone system. Again, the same problems arise, since there is a separate voice mail system coupled to a telephone system where software in the personal computer operates the voice mail portion.

One of the problems that arises with the prior art systems is the inability of a caller who has been placed on hold to exit from the hold situation and dial another extension. In other words, the caller who has been placed on hold is placed in a state of "limbo" where they are at the mercy of the telephone system, and actually at the mercy of the person who has placed them on hold. The result that often occurs is that the caller will hang up, resulting in the possible loss of business from that customer for the future.

The prior art systems discussed above utilize an external port for connecting to the call on hold an external sound system, such as a radio or a tape player playing taped messages. Once the caller is connected to this external source, the caller is unable to exit this status without assistance from someone internal to the telephone system, such as the person who placed the caller in the on-hold state. Therefore, there is a need in the art for a system and method for enabling a call to request and be connected to another-destination while the call is on hold.

SUMMARY OF THE INVENTION

The foregoing need is addressed by the present invention, which provides a system and method within a telephone call/voice processing system for enabling a call placed on hold to be connected to another destination. This may be implemented by the call on hold placing a request to be connected to another destination and then connecting the call on hold to the other destination in response to the request. The request may be made by the caller on hold dialing DTMF-like digits, which are recognized by a signal processing circuit, which then connects the call on hold to the destination associated with the dialed digits.

In one embodiment of the present invention, the call placed on hold may originate from an incoming call. In another embodiment of the present invention, the call on hold may have been originated as an outgoing call.

In another embodiment of the present invention, when the call is placed in an on-hold status, a message is played to the call on hold, wherein the message may be comprised of voice and/or music, which has been digitized and stored within the system. When the call on hold is to be connected to the requested destination, the message played to the call on hold is disconnected.

In one embodiment of the present invention, the call on hold may have occurred as a result of a "park" operation.

In another embodiment of the present invention, the call on hold may be located within an automatic call distribute (ACD) queue.

In yet another alternative embodiment of the present invention, the call on hold may be in a position where the call is currently being transferred to another destination, and the call on hold requests and receives a connection to an alternative destination requested by the call on hold before the transfer process is completed.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

In the following description, numerous technical details are set forth such as specific word length and specific hardware interfaces, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 1:
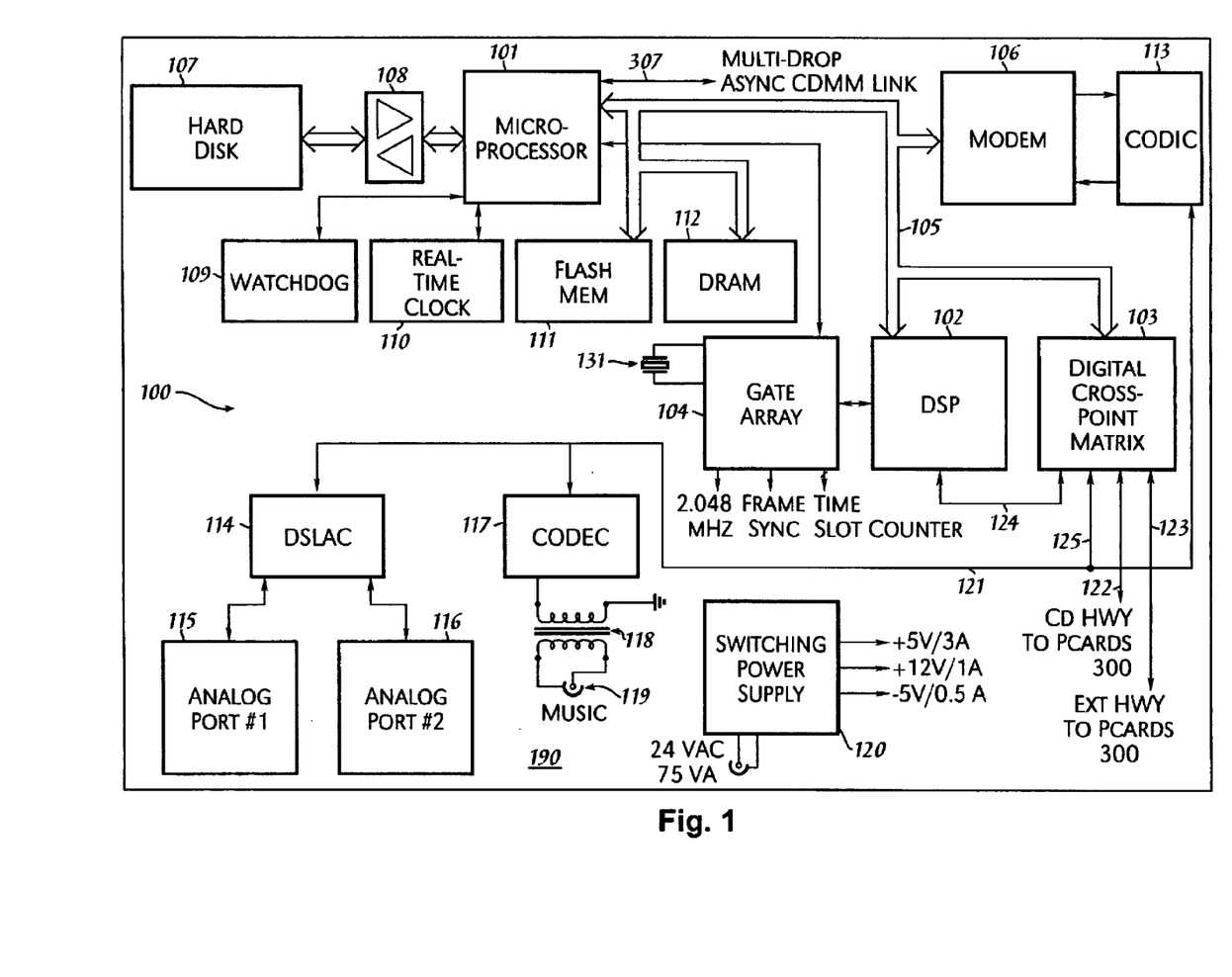
FIG. 1 illustrates, in block diagram form, components of the present invention.

Referring to FIG. 1, there is illustrated, in block diagram form, system 100 for integrating call processing and voice processing using a single processing means, which in this example is one microprocessor 101. Microprocessor 101, which may be a Motorola 68000 class microprocessor, communicates with hard disk 107 using driver circuitry 108. Hard disk 107 stores program data, voice prompts, voice mail messages, and all other types of speech used within system 100.

Microprocessor 101 also includes watchdog timer 109 and real-time clock source 110.

Microprocessor 101 is coupled via bus 105 to flash memory 111 and dynamic random access memory ("DRAM") 112. Flash memory 111 is used to store bootstrap data for use during power up of system 100. DRAM 112 stores the program accessed by microprocessor 101 during operation of system 100.

Bus 105 also couples microprocessor 101 to signal processing circuitry, which in this example is digital signal processor ("DSP") 102. Digital signal processor ("DSP") 102 implements a number of functions traditionally implemented by discrete analog components.

Figure 5:
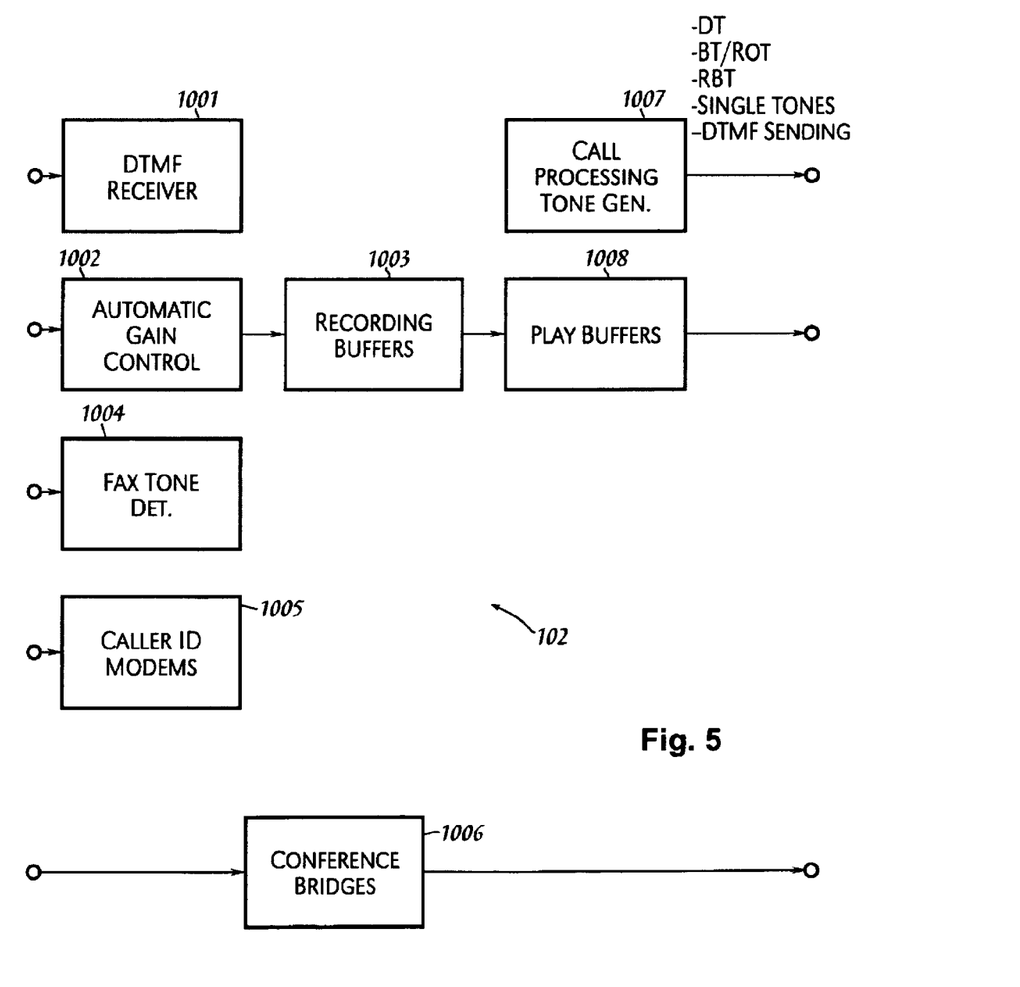
FIG. 5 illustrates functions implemented within a signal processing circuit within the present invention.

Referring next to FIG. 5, there are illustrated some of the primary functions implemented in DSP 102. DTMF receivers 1001 are implemented using frequency domain filtering techniques. DTMF receivers 1001 detect all 16 standard DTMF (touch-tone) digits.

Automatic gain control ("AGC") 1002 is a closed-loop gain control system which normalizes received audio levels during recording.

Recording buffers 1003, which are coupled to AGC 1002, receive and store speech samples after they have passed through AGC block 1002. These speech samples are converted to μ-law PCM (Pulse Code Modulation) and double buffered (several samples per buffer). Microprocessor 101 copies the record data out of DSP buffers 1003 into RAM buffers (not shown), which are located in the microprocessor 101 data RAM area.

Fax tone detector 1004 is implemented using frequency domain filtering techniques. Fax tone detector 1004 detects the standard 1100 Hz FAX CNG tone (also referred to as the Calling Tone).

Caller ID modems 1005 are 1200 baud FSK modems similar to Bell 202-type modems. Caller ID modems 1005 are implemented as a frequency discriminator where a time delayed (quadrature) signal is multiplied by the original signal, low pass filtered, then sliced, which produce the square wave caller ID data stream.

Call processing tone generators 1007 are free running oscillators which generate the appropriate tones (and tone pairs) which make up the industry standard call processing tones. These tones include:

dial tone busy/reorder tone ring back tone single frequency (440 Hz) tone

DTMF dialer tones

Play buffers 1008 replay data from hard disk 107 through microprocessor 101 and place this play data in buffers 1008. This data is converted from an 8-bit μ-law PCM signal to 14-bit linear data.

Conference bridges 1006 allow multiple conference bridges to mix together conferees into a multi-party conference. These conferees may be a mixture of inside and outside parties. A combination of "loudest speaker" and "summing" is utilized.

DSP 102 communicates with microprocessor 101 via a host interface port ("HIP") via bus 105. The HIP link supports a command-based protocol, which is used to directly read or write DSP memory locations. DSP 102 is a RAM-based part and has its program downloaded from microprocessor 101. Once downloaded and running, microprocessor 101 (the host) polls for events or receives interrupts indicating that data is available. DSP 1.02 speech connections are made over an industry standard 32-time slot, 2.048 megabits per second (Mb/s) digital serial link 124. Link 124 occupies one of the digital highways implemented by digital cross-point matrix 103. Each service of DSP 102 occupies a single time slot. For example, DTMF receiver I occupies time slot 0 while conference bridge circuit 12 occupies time slot 31.

Digital cross-point matrix 103 is also coupled to bus 105 and operates to connect any voice path to any other voice path. Digital cross-point matrix 103 is a VLSI (Very Large Scale Integration) integrated circuit. An example of digital cross-point matrix 103 is manufactured by MITEL Semiconductor Corporation as part No. 8980. Digital cross-point matrix 103 communicates with microprocessor 101 via a memory mapped input/output (I/O) scheme. A command/control protocol is used for communication between microprocessor 101 and digital cross-point matrix 103 via bus 105. Cross-point matrix 103 is coupled by highway 124 to DSP 102. Cross-point matrix 103 is coupled by connection 125 to highway 121. Cross-point matrix 103 is also coupled to peripheral cards by highways 122 and 123. The peripheral cards are described in further detail below with respect to FIG. 3.

Connections 121–125 are referred to as "highways", which are transmission links using time-division multiplexing ("TDM") as a means for transmitting and receiving data.

Digital cross-point matrix 103 is capable of making 256 simultaneous fully non-blocking connections within system 100. However, system 100 may be upgraded by adding additional DSPs and/or cross-point matrices.

Cross-point matrix 103 makes connections using the TDM highway by receiving instructions from microprocessor 101 to interconnect channels within the frames of the TDM bit stream. This results in the non-blocking capability of cross-point matrix 103, and also allows for a single voice resource, caller, or voice message to be simultaneously coupled to multiple other voice resources, station or CO originated callers, and/or voice messages.

Gate array 104 is an SRAM (Static Random Access Memory) based device. An example of gate array 104 is manufactured by XILINX. Gate array 104 is responsible for generating all system timing. A master clock signal is provided by microprocessor 101 at 16.384 MHz. This clock signal is divided down to provide a number of phase coherent system clocks such as 4.096 MHz, 2.048 MHz and 8 KHz (frame sync). In addition, a 5-bit time slot counter is implemented which allows all the system CODECs to detect the appropriate time slot to use (0–31). An additional divider chain is included to divide the system clock down to 20 Hz, which is used by the ringing generator power supply (not shown).

Gate array 104 is downloaded at boot-up by system software. Gate array 104 is based on an SRAM architecture. That is, the internal fusible links commonly found in programmable logic are actually stored in volatile SRAM. Because of this architecture, gate array 104 is downloaded after power-up. Also, note the added flexibility of being able to modify the logic by simply loading new system software. Because the device is SRAM-based, it loses its programming when power is removed.

Bus 105 is also coupled to modem 106, which provides a capability of calling into system 100 on a remote basis to load additional programs, voice prompts, etc., or updates thereto, into hard disk 107. Modem 106 is coupled to coder/decoder ("CODEC") 113, which is coupled to highway 121. This connection allows coupling of modem 106 through cross-point matrix 103 to CO lines through highway 122 and the p-card described below with respect to FIG. 3.

Also coupled to highway 121 is dual subscriber line access chip 114, which is well-known in the art, and which is coupled to analog ports 115 and 116, which provide an ability for system 100 to communicate to analog-type connections such as cordless telephones and fax machines.

Highway 121 is also coupled to CODEC 117, which is coupled to transformer 118 to a music source 119, which provides an ability to couple an external music source to a caller through cross-point matrix 103 for such things as providing the caller with music on-hold.

Power to system 100 is provided through switching power supply 120, which converts AC to the various DC supply voltages needed by circuitry within system 100.

Figure 3:
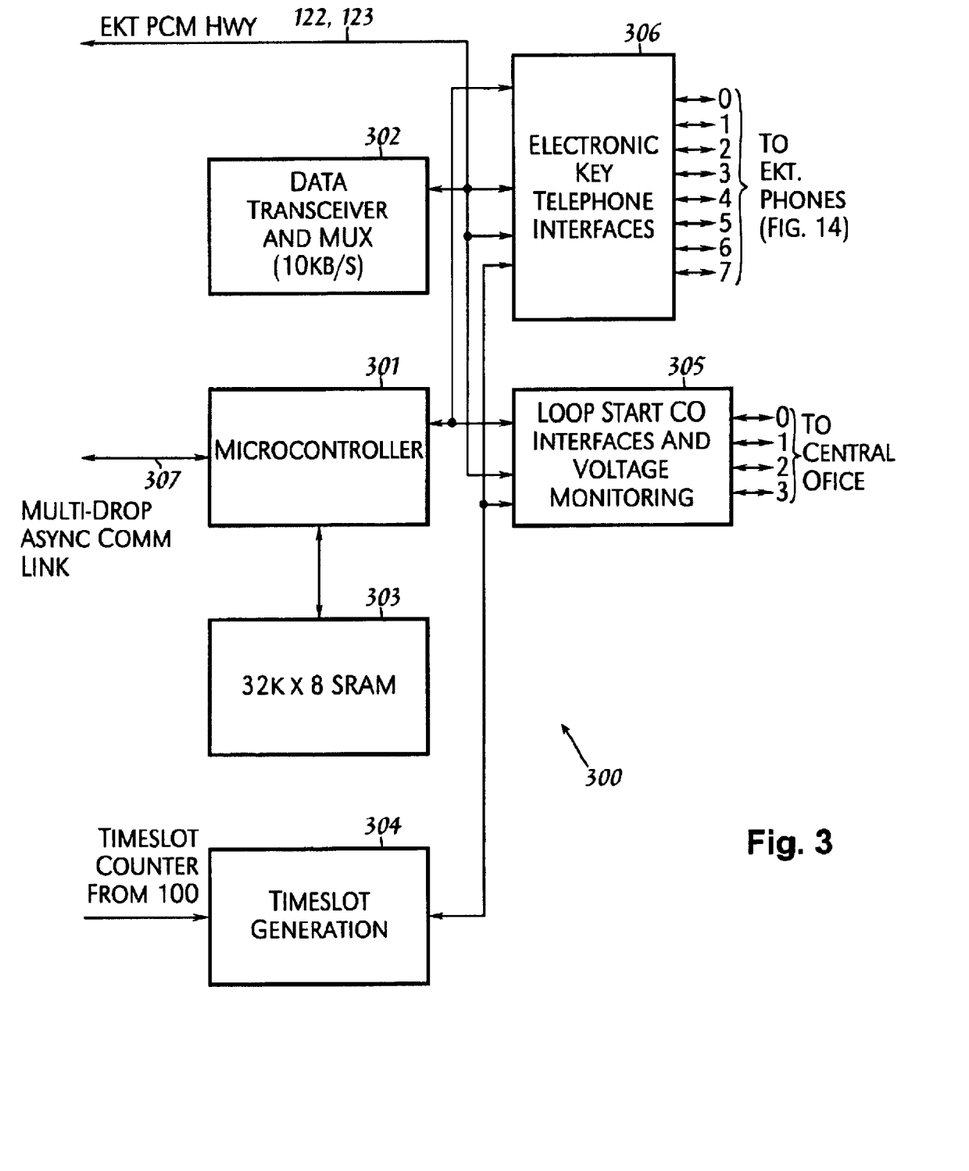
FIG. 3 illustrates, in block diagram form, components of a port card implemented within the present invention.

Referring next to FIG. 3, there is illustrated peripheral-card ("p-card") 300, which is coupled to main board 190 of system 100. Main board 190 communicates with p-card 300 via a multi-drop async serial link 307. This connection 307 is made directly to microprocessor 101 (via buffers not shown). P-card 300 provides interconnections between CO lines and extension lines to system 100.

Microcontroller 301 is an 8-bit microcontroller, an example of which is manufactured by Hitachi as Part No. H8, which controls all the real-time functions associated with p-card 300. Microcontroller 301 is responsible for all low-level communication with the EKTs 1400 (electronic key telephones) (see FIG. 8) and CO lines. A low level event is an event which is specific to the hardware and is required to be handled in real-time. These events are unique to the EKT or CO trunk protocol. In contrast, high level events can be abstracted to have no correlation to actual hardware. An example of a high level event might be "Turn the SPKR LED On." The corresponding low-level event would be "Send HEX Code 21 to EKT Address 4." This level of abstraction helps stabilize the complex system software. Another example would be that system software can send a command to seize a CO trunk without being concerned with the low-level differences between a ground start or DID trunk. Some of the low-level tasks include updating EKT LEDs and LCD displays, decoding key press messages from the EKTs 1400, scanning the CO status bits and filtering RING and CO seizure events.

Microcontroller 301 converts these low-level real-time events to high-level events which form a protocol referred to as the ESi Command Language (ECL). This ECL protocol is implemented on multi-drop async serial channel 307 between main board 190 and all p-cards 300 in system 100. Microcontroller 301 contains 2 async serial ports. One of these serial ports is connected to main board 190, and the other port drives data transceiver and multiplexer 302.

When p-card 300 is plugged into main board 190 (via ribbon cable (not shown)) a card address is assigned to p-card 300. This card address is read by microcontroller 301 and is used to filter commands over communication link 307. When main board 190 software wants to communicate with the specific p-card 300, the address is sent in the message packet which all p-cards 300 receive. P-cards 300 match the address in the message to the hard wired address on the ribbon cable. If a match is made, only that p-card 300 responds to the command set.

Microcontroller 301 contains an internal program memory (not shown) and is connected to an external SRAM 303. The internal program memory contains a bootstrap program which upon reset or power-up, requests a fresh firmware load from main board 190. This firmware load is transferred to SRAM 303. Upon download completion, the program is run from within SRAM 303. This scheme allows for microcontroller 301 firmware to be updated and loaded at any time.

Main board 190 sources all system timing through block 304. Timing signals to p-card 300 consists of a 2.048 MHz clock signal, an 8 KHz frame sync, which signifies the first time slot of a 32 time slot highway, and 5 time slot counter bits, which represent a binary count from 0 to 31.

As mentioned above, p-card 300 is assigned a card slot address when it is connected to main board 190. This card slot address is used to calculate which time slots p-card 300 should be using. The time slots used for the CO CODECs 1204 (see FIG. 7) are actually generated by the time slot assignment circuitry contained in the DSLAC chip. There are two separate 2.048 MHz (32 time slot) highways 122 and 123 that run between main board 190 and p-card 300. One (123) is for the EKTs 1400 and the other (122) is for the COs.

Figure 6:
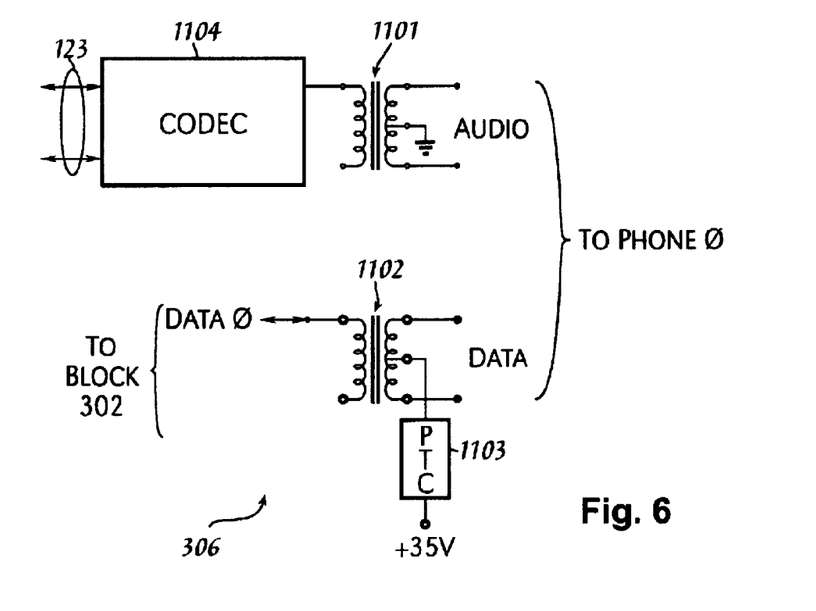
FIG. 6 illustrates an electronic key telephone interface.

Referring to FIGS. 3 and 6, EKT interface 306 describes the connection between system 100 and electronic key telephone (EKT) 1400. This interface consists of two physical pairs of wires running between system 100 (often referred to as a Key System Unit (KSU)) and EKT 1400. One of these pairs supports an analog bi-directional audio path and the other supports a bi-directional digital control channel.

EKT 1400 is connected to the KSU via transformers 1101 and 1102, providing a high degree of isolation as well as longitudinal balance. Transformer 1101 is for the audio path and transformer 1102 is for the data path on each end of the connection. Power is supplied to EKT 1400 by phantoming the power through the center taps of transformers 1101 and 1102. The KSU supplies a nominal voltage of 36 volts DC which passes through a positive temperature co-efficient varistor ("PTC") 1103. PTC 1103 acts as a resettable fuse which becomes very resistive during excessive current flow (such as when a short in the station wiring occurs). EKT 1400 regulates down to +12 and +5 volts.

The audio path is a dry analog bi-directional path consisting of a traditional hybrid (2:4 wire converters) on each end. The audio path on p-card 300 is converted to a 4-wire path by the hybrid circuit in interface 306. The separate transmit and receive paths are gain adjusted and connected to CODEC 1104. CODEC 1104 converts the analog signals to digital and presents these voice signals to EKT highway 123. EKT highway 123 consists of a 2.048 Mb/s serial stream which is divided into 32 64 Kb/s time slots. Each CODEC 1104 occupies one time slot on highway 123. System 100 reserves two time slots per EKT 1400 for future migration to a fully digital 2B+D EKT where two 64 Kb/s digital channels are available to each station instrument.

Timing for CODECs 1104 is supplied by time slot generation block 304, which is coupled to the time slot counter output from system timing block 104 (see FIG. 1).

The EKT data is produced by a UART (Universal Asynchronous Receiver/Transmitter) in microcontroller 301. This NRZ transmit and receive data is presented to data transceiver and multiplexer 302. A single data transceiver is used for all 8 EKT circuits and is multiplexed through an 8-channel analog mux to each EKT data transformer 1102 in a round-robin fashion.

Messages to EKT 1400 consist of commands such as POLL, TURN_ON_LED, WRITE_LCD_CHARACTER, RING PHONE, etc. Response messages from EKT 1400 consists of a lower level key command in the first 5 bits and a single hook switch bit in the 8th bit. If the 7th bit of the response message is set, a high level response command such as FIRMWARE_VERSION or TERMINAL_TYPE is present in the first 5 bits.

Figure 7:
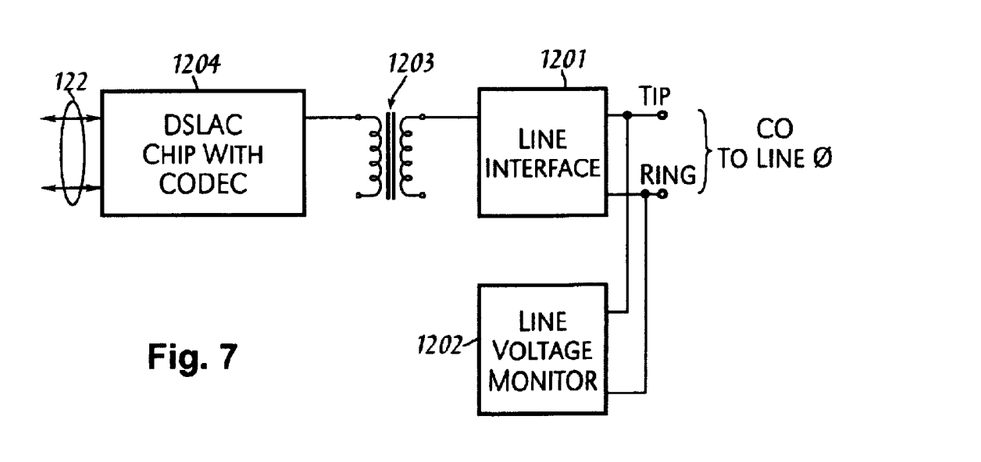
FIG. 7 illustrates a loop start CO interface.

Referring next to FIGS. 3 and 7, the loop start central office (CO) lines are supplied by the local telephone company and consist of a wet balanced differential audio pair. The term "wet" refers to the fact that a voltage of −48 volts is present on the pair. System 100 requests dial tone from the CO by providing a nominal 200 ohm loop across the TIP and RING conductors and releases the connection by opening the loop.

The CO rings system 100 by placing a 90 vrms AC, 20 Hz sine wave on the TIP and RING conductors. System 100 seizes the line by going off hook.

P-card 300 incorporates a unique circuit which monitors the voltage present across TIP and RING of each CO. This line voltage monitor circuit 1202 serves to detect the ring voltage present during ringing (ring detection) and the unique feature of monitoring the CO line status for conditions such as whether the CO is plugged in or if someone is off hook in front of system 100. The latter can be used to detect theft of service or allow a credit card verification terminal to be used without interfering with normal system operation.

Voltage monitor 1202 consists of a balanced differential op-amp connected across TIP and RING of the CO lines through a very high impedance (>10 M ohms). The output of the four voltage monitor op-amps are fed to an analog-to-digital converter with a built-in analog multiplexer (not shown). Microcontroller 301 firmware monitors the line voltages.

There is also a balanced differential AC coupled op amp across the CO TIP and RING to monitor the low level audio tones present during caller ID. The output of these op-amps are selected via an analog switch during the idle period and are connected to the CO line CODEC 1204.

To correctly terminate the CO line (seizure) care must be taken to satisfy the DC loop requirements (~200 ohms) and the AC impedance requirements (~600 ohms). The classic approach has been to terminate TIP and RING with an inductor (called a holding coil) which has a large inductance (>1 Hy) and a DC resistance of ~200 ohms. The inductor separates the AC and DC components to give the desired effect. The problem is that the inductor must be large enough not to saturate with currents as high as 100 milliamps. An inductor which satisfies these requirements is physically cumbersome.

P-card 300 incorporates a solid state inductor circuit called a gyrator (not shown) to implement the holding coil function. This single transistor emulates an inductor with the above requirements while taking up very little PCB space.

A small solid state relay (not shown) is used as the hook switch. When energized, the gyrator holding coil is placed across TIP and RING closing the loop. The audio present on TIP and RING is AC coupled to a small dry transformer 1203. The secondary of this transformer 1203 is connected to the AC termination impedance and to the CODEC 1204, which is implemented on a dual subscriber line access chip ("DSLAC").

High voltage protection is provided for all paths on the TIP and RING connections. These paths include TIP to RING, TIP to GROUND, RING to GROUND, and TIP and RING to GROUND. This high voltage protection is accomplished by first passing the TIP and RING conductors through positive temperature coefficient varistors (not shown). These varistors act as resettable fuses. When excessive current flows through these varistors, they become resistive thus limiting the current flow. When the excessive current is stopped, the original resistance is restored.

DSLAC 1204 consists of two identical circuits which contain the CODEC, DSP-based echo canceller, gain control and time slot assignment circuit. DSLAC 1204 is controlled by microcontroller 301 to set parameters such as echo canceler coefficients, gain coefficients and time slots.

Figure 9:
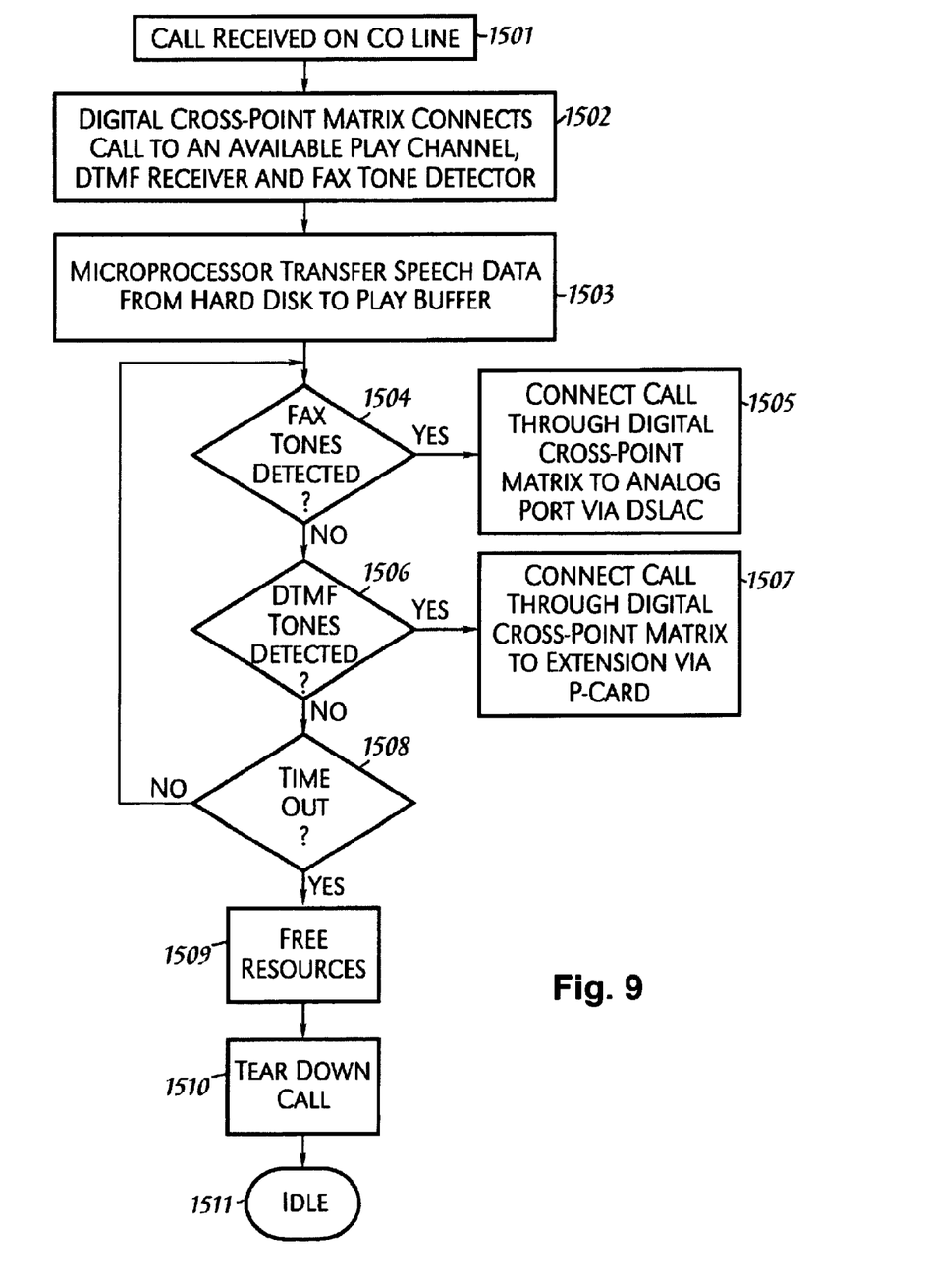
FIG. 9 illustrates a process for implementing an auto attendant within the present invention.

Referring next to FIG. 9, the following is an example of how an auto-attendant call is processed by system 100. A telephone call comes in on one of the available central office ("CO") lines (step 1501). The call is answered and the speech path for the CO line is connected through digital cross-point matrix 103 to an available "play" channel (play buffer 1008) in DSP 102 (step 1502). Also during set-up, a connection is made to an available DTMF receiver 1001. A connection is also made to one of the available fax tone detector channels 1004 in case the incoming call is a facsimile transmission. In step 1503, microprocessor 101 accesses hard disk 107 and transfers speech data to play buffers 1008. Next, in step 1504, a determination is made whether or not FAX tones have been detected by FAX tone detector 1004. If FAX tones are detected, then in step 1505, microprocessor 101 will instruct digital cross-point matrix 103 to connect the incoming call to one of analog ports 115 or 116 coupled to DSLAC 114. If FAX tones are not detected, then the process determines whether or not DTMF tones have been detected in step 1506. If yes, then in step 1507, digital cross-point matrix 103 is instructed to connect the incoming call to an extension coupled to p-card 300. If DTMF tones are not detected, then the process determines whether nor not a predetermined amount of time has passed in step 1508. If yes, then the call is terminated by freeing resources in step 1509 and tearing down the call in step 1510 to place the system in an idle state (step 1511).

If the caller dialed an extension and that extension has answered, a speech path connection is made between the extension and the incoming CO line.

Figure 8:
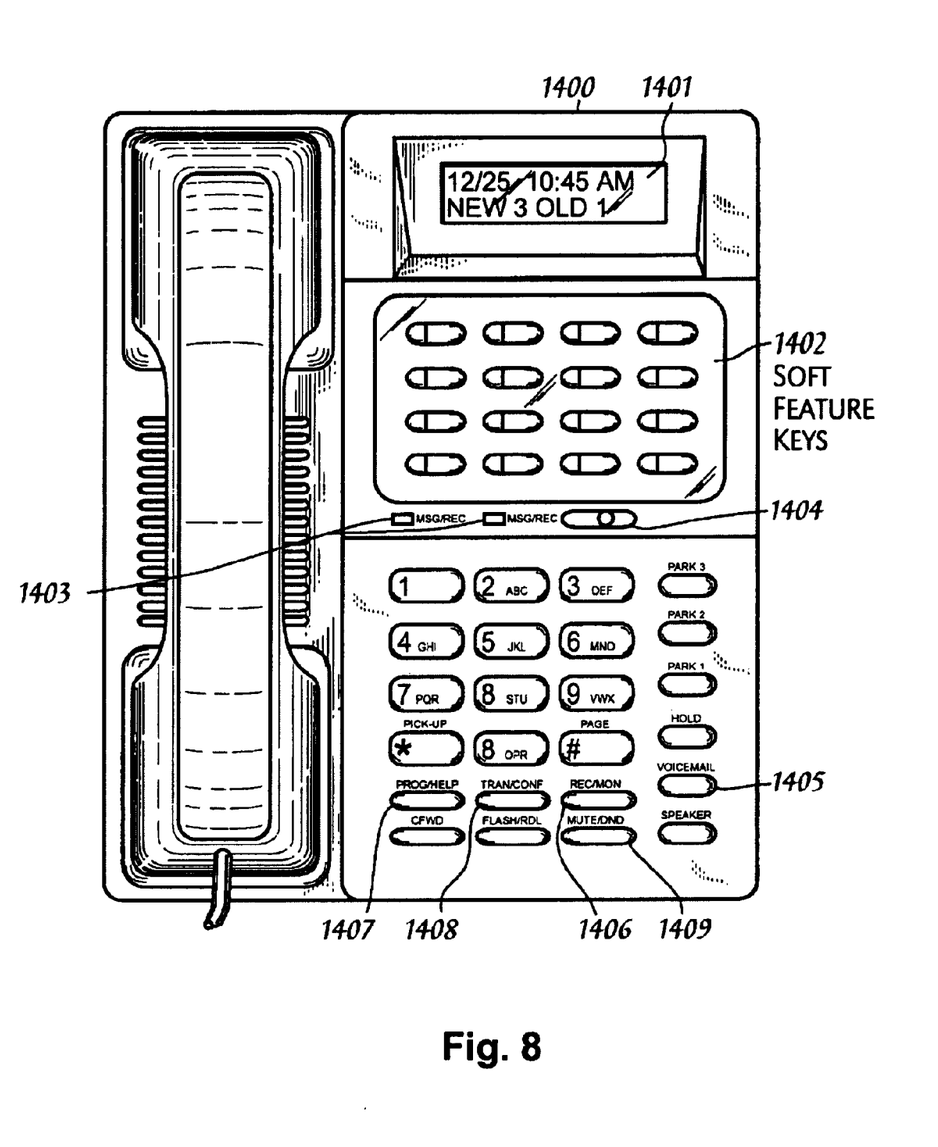
FIG. 8 illustrates an EKT.

Referring next to FIG. 8, there is illustrated EKT 1400, which includes many of the well-known features of a typical telephone, such as LCD display 1401, soft feature keys 1402 for such features as Station, Speed Dial, Line Keys, etc., speaker/handset volume control 1404, and message and speaker LEDs 1403. Of particular interest and described in further detail below are the program/help key 1407, the record/monitor key 1406, and the voice mail key 1405, which are part of the fixed feature keys on EKT 1400.

Figure 10:
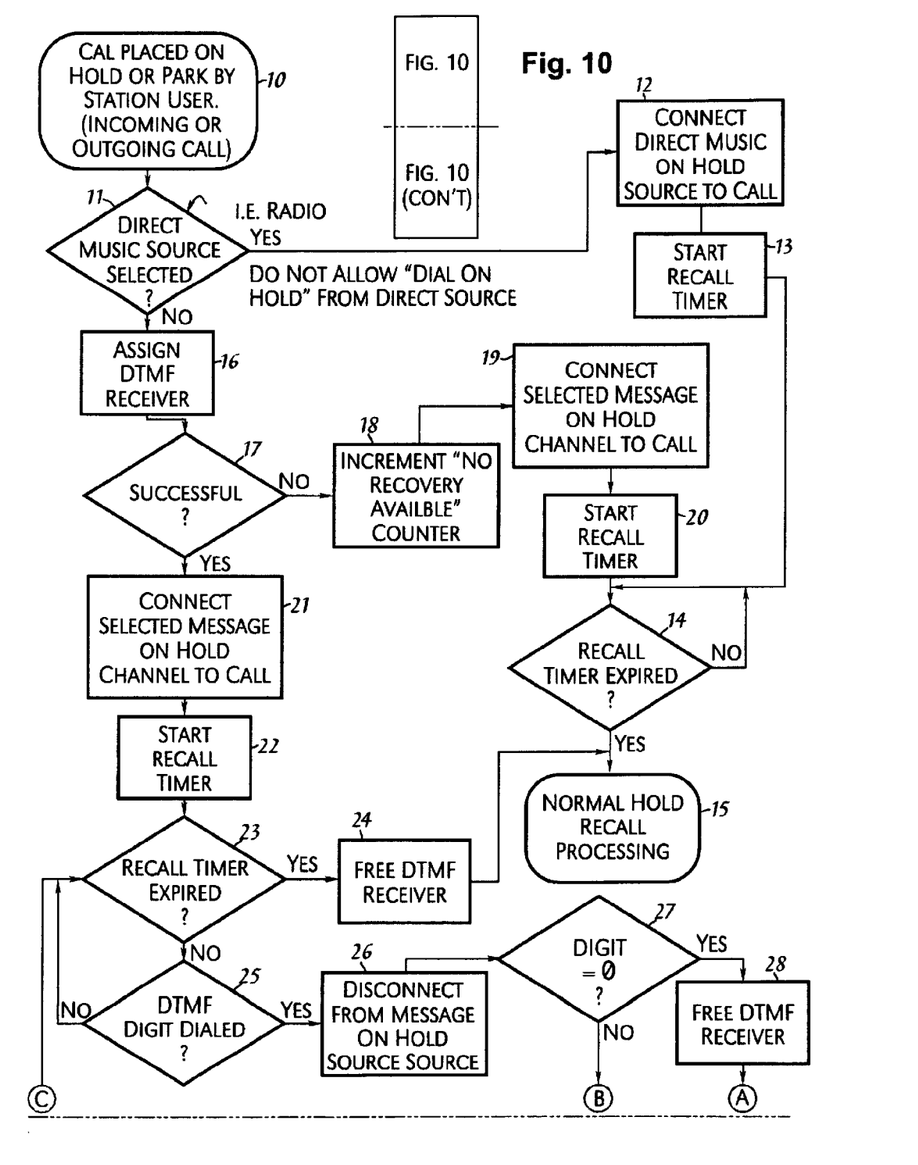
FIG. 10 illustrates a process for dial on-hold and message on-hold.

Referring next to FIG. 10, there is illustrated a process for message on-hold and dial on-hold. In step 10, a call (originated as an outgoing call or as an incoming call) is placed on hold by an internal user or process, placed in a park situation, is in the process of being transferred to another destination by a station user, or is placed within an ACD queue. Thereafter, in step 11, a determination is made whether or not a direct music on-hold source is to be connected to the call. Such a direct music on-hold source is one such as mentioned above with respect to the prior art where there is an external port from the system to which an external source is connected such as an analog music source or a tape recorder for playing music from a radio, or for playing messages previously recorded.

If the call on hold is connected to a direct music on-hold source, then the dial on-hold feature of the present invention is not permitted. The process would then proceed to step 12 to connect the direct music on-hold source to the call. Thereafter, in step 13, a recall timer is started. In step 14, a determination is made whether or not the recall timer has expired. If not, a loop is entered until the recall timer has expired. Under such a condition, the process then proceeds to step 15 to begin a normal hold recall process. Under steps 12–15, the call on hold is placed in the previously mentioned "limbo" state whereby the call on hold is at the mercy of the station user who placed the call in the on-hold state.

If in step 11, the call on hold is not connected to a direct music on-hold source, then, in step 16, a DTMF receiver 1001, or an equivalent device, is coupled to the call on hold. If this process is not successful in step 17, then in step 18, a "no receiver available" counter is incremented. Then in step 19, a current message on-hold channel is connected to the call. This may be accomplished by connecting the call on hold to a play buffer 1008, which has been downloaded with a message from system memory (i.e., DRAM 112, hard disk 107, etc.). The process then would proceed to step 20 to begin a recall timer. The process described above with respect to steps 14 and 15 is then implemented.

If in step 17, a DTMF receiver is assigned to the call on hold, then in step 21, a current message on-hold channel may be connected to the call on hold, as similarly described above with respect to step 19.

Thereafter, in step 22, a recall timer is begun. In step 23, a determination is made whether or not the recall timer has expired. If yes, the process proceeds to step 24 to free the call on hold from the DTMF receiver 1001 and the process then proceeds to a normal hold recall processing in step 15 as described above.

If in step 23 the recall timer has not expired, then the process proceeds to step 25 to determine whether or not any DTMF-like digits have been dialed by the call on hold. If no, the process returns to step 23. However, if such DTMF-like signals have been dialed by the call on hold, the process proceeds to step 26 to disconnect the call on hold from the message on-hold source (play buffer 1008). The process then proceeds to step 27 to determine whether or not the "0" digit has been dialed by the call on hold. If yes, then the call on hold has requested the operator and the process proceeds to step 28 to free the call on hold from DTMF receiver 1001. The process then proceeds to step 33 to process the call in a normal fashion by a transfer of the call to the operator.

If in step 27, a "0" digit is not received, but in step 29 other digits have been received, these digits are collected. In step 30, a determination is made whether or not the digits represent a valid extension number. If not, then in step 31 the call is reconnected to the message on-hold source and the process returns to step 23. If in step 30, the numbers dialed by the call on hold represent a valid extension number, then in step 32, the call on hold is disconnected from the DTMF receiver 1001 and the call on hold is processed in step 33 in a normal fashion, which may be the transfer of the call on hold to the requested extension number.

The determination of whether or not a received extension number is a valid one may be performed by a comparison of all valid extension numbers in the system with the digits received and decoded by the DTMF receiver 1001.

In an alternative embodiment, the system may be configured to recognize digits or the name of a person spoken by the caller on hold and then proceed to connect the caller on hold to the requested destination.

Although the present invention and its advantages have been described in detail, it should be understood that various changes, substitutions and alterations can be made herein without departing from the spirit and scope of the invention as defined by the appended claims.

What is claimed is:

1. A telephone call and voice processing system comprising:
   switching circuitry adaptable for receiving an incoming call, wherein the switching circuitry is adaptable for connecting the incoming call to a telephone coupled to the system;
   voice processing circuitry adaptable for automatically interacting with the incoming call, wherein the switching circuitry and the voice processing circuitry are controlled by a single set of software, wherein the voice processing circuitry further comprises a signal processing means, wherein the switching circuitry further comprises a digital cross-point matrix coupled to the single processing means and to the signal processing means;

circuitry for placing the incoming call on hold; and circuitry for connecting the call on hold to a message source.

2. The system as recited in claim 1, wherein the circuitry for connecting the call on hold to the message source further comprises:

connecting a play buffer in the signal processing means to the call on hold; and downloading a message from digital storage to the play buffer.

3. The system as recited in claim 2, wherein the message is digitized music.

4. The system as recited in claim 2, wherein the message is digitized voice.

5. The system as recited in claim 1, further comprising:

circuitry for enabling the call on hold to be connected to another destination.

6. The system as recited in claim 5, wherein the enabling circuitry further comprises:

circuitry for receiving a request from the call on hold to be connected to the another destination; and circuitry for connecting the call on hold to the another destination.

7. The system as recited in claim 5, wherein the call on hold is in an ACD queue.

8. The system as recited in claim 5, wherein the call on hold has been parked.

9. The system as recited in claim 6, wherein the connecting circuitry further comprises circuitry for removing the call on hold from the on-hold status.

10. The system as recited in claim 6, wherein the request is in a form of DTMF-like digits dialed by a person associated with the call on hold.

11. The system as recited in claim 6, wherein the request is in a form of a voice request issued by a person associated with the call on hold.

12. The system as recited in claim 6, further comprising circuitry for disconnecting the on-hold message from the call on hold after receiving the request.

13. In a telephone call/voice processing system, a method comprising the steps of:

receiving an incoming call;

placing the call on hold;

assigning a DTMF receiver to the call on hold;

connecting a message on hold channel to the call on hold;

determining if any DTMF-like signals have been received from the call on hold;

if the DTMF-like signals have been received from the call on hold, then disconnecting the call on hold from the message on hold channel;

collecting the DTMF-like signals and determining if such signals represent a valid extension number;

if the DTMF-like signals represent a valid extension number, disconnecting the call on hold from the DTMF receiver;

transferring the call on hold to a telephone extension associated with the valid extension number;

after the step of placing the call on hold and before the step of assigning a DTMF receiver to the call on hold, determining if a direct music on hold source is available;

if the direct music on hold source is not available, then performing the step of assigning the DTMF receiver to the call on hold;

if the direct music on hold source is available, connecting the direct music on hold source to the call on hold;

beginning a recall timer after the step of connecting the direct music on hold source to the call on hold;

determining if the recall timer has expired; and if the recall timer has expired, performing a normal hold recall process.

14. In a telephone call/voice processing system, a method comprising the steps of:

receiving an incoming call;

placing the call on hold;

assigning a DTMF receiver to the call on hold;

connecting a message on hold channel to the call on hold;

determining if any DTMF-like signals have been received from the call on hold;

if the DTMF-like signals have been received from the call on hold, then disconnecting the call on hold from the message on hold channel;

collecting the DTMF-like signals and determining if such signals represent a valid extension number;

if the DTMF-like signals represent a valid extension number, disconnecting the call on hold from the DTMF receiver;

transferring the call on hold to a telephone extension associated with the valid extension number;

if the step of assigning a DTMF receiver to the call on hold is not successful, incrementing a no receiver available counter;

connecting a message on hold channel to the call on hold;

beginning a recall timer;

determining if the recall timer has expired; and when the recall timer has expired, performing normal hold recall processing of the call on hold.

15. In a telephone call/voice processing system, a method comprising the steps of:

receiving an incoming call;

placing the call on hold;

assigning a DTMF receiver to the call on hold;

connecting a message on hold channel to the call on hold;

determining if any DTMF-like signals have been received from the call on hold;

if the DTMF-like signals have been received from the call on hold, then disconnecting the call on hold from the message on hold channel;

collecting the DTMF-like signals and determining if such signals represent a valid extension number;

if the DTMF-like signals represent a valid extension number, disconnecting the call on hold from the DTMF receiver;

transferring the call on hold to a telephone extension associated with the valid extension number;

after the step of connecting a message on hold channel to the call on hold and before any DTMF-like signals have been received from the call on hold, beginning a recall timer;

determining whether the recall timer has expired;

if the recall timer has expired before the DTMF-like signals have been received from the call on hold, freeing the DTMF receiver from the call on hold; and performing a normal hold recall process of the call on hold.

16. In a telephone call/voice processing system, a method comprising the steps of:

placing a call on hold; and enabling the call on hold to be connected to another destination, wherein the connection to another destination is initiated by an action taken by the call on hold, wherein the action can be taken by the call on hold without being preceded by a prompt from an auto-attendant.

17. A telephone call/voice processing system comprising:

circuitry for placing a call on hold; and circuitry for enabling the call on hold to be connected to another destination, wherein the connection to another destination is initiated by an action taken by the call on hold, wherein the action can be taken by the call on hold without being preceded by a prompt from an auto-attendant.

* * * * *

UNITED STATES PATENT AND TRADEMARK OFFICE
CERTIFICATE OF CORRECTION

PATENT NO. : 6,940,962 B1  
APPLICATION NO. : 08/872714  
DATED : September 6, 2005  
INVENTOR(S) : Hansen, II et al.

It is certified that error appears in the above-identified patent and that said Letters Patent is hereby corrected as shown below:

Column 1, the following paragraph should be inserted after the Title of Invention and before the CROSS-REFERENCE TO RELATED APPLICATION:
- - This application claims priority to U.S. Provisional Patent Application Serial No. 60/023,749, filed June 12, 1996. --.

Claim 16, Column 13, Lines 10-13, Column 14, Lines 1-2 should read:
placing a call in a hold state; and
enabling the party placed in the hold state to be connected to another destination, wherein the connection to another destination is initiated by an action taken by the party placed in the hold state, wherein the action can be taken by the party placed in the hold state without being preceded by a prompt from an auto-attendant.

Claim 17, Column 14, Lines 6-12, should read:
circuitry for placing a party to a call in a hold state; and
circuitry for enabling the party placed in the hold state to be connected to another destination, wherein the connection to another destination is initiated by an action taken by the party placed in the hold state, wherein the action can be taken by the party placed in the hold state without being proceeded by a prompt from an auto-attendant.

Signed and Sealed this

Fifteenth Day of August, 2006

JON W. DUDAS  
*Director of the United States Patent and Trademark Office*